United States Patent [19]

Chen et al.

[11] 4,423,085
[45] * Dec. 27, 1983

[54] COCRYSTALLIZED SUGAR-NUT PRODUCT

[75] Inventors: Andy C. C. Chen, Belle Mead; Anthony B. Rizzuto, Hackettstown; Martin F. Veiga, Wallington, all of N.J.

[73] Assignee: Amstar Corporation, New York, N.Y.

[ * ] Notice: The portion of the term of this patent subsequent to Jul. 6, 1999, has been disclaimed.

[21] Appl. No.: 371,266

[22] Filed: Apr. 23, 1982

[51] Int. Cl.³ .......................... A23L 1/36; A23L 1/38; C13F 3/00
[52] U.S. Cl. .................................. 426/632; 127/29; 426/633; 426/617
[58] Field of Search ............... 426/632, 633, 617, 639, 426/640, 93, 103, 658, 659, 660, 661, 573, 576, 575, 566, 590, 548, 654, 629, 631, 578, 579, 615, 593, 584, 594, 597, 565, 567, 599; 127/29, 30, 58

[56] References Cited

U.S. PATENT DOCUMENTS

| | | | |
|---|---|---|---|
| 113,047 | 3/1871 | Harbach et al. | 426/617 |
| 931,137 | 8/1909 | McDonald et al. | 426/632 |
| 1,102,607 | 7/1914 | Samaha et al. | 426/639 |
| 1,778,537 | 10/1930 | Steely | 426/632 |
| 2,780,549 | 2/1957 | Bloch | 426/658 |
| 3,194,682 | 7/1965 | Tippens et al. | 426/658 |
| 3,365,331 | 1/1968 | Miller et al. | 127/30 |
| 4,338,350 | 7/1982 | Chen et al. | 426/658 |
| 4,362,757 | 12/1982 | Chen et al. | 426/599 |

FOREIGN PATENT DOCUMENTS 50-009859 4/1975 Japan .................................. 426/632

*Primary Examiner*—Raymond N. Jones
*Assistant Examiner*—Elizabeth J. Curtin
*Attorney, Agent, or Firm*—Cooper, Dunham, Clark, Griffin & Moran

[57] ABSTRACT

A cocrystallized sugar-nut product and a method for preparing such product are disclosed. A concentrated sugar syrup is prepared through evaporation, and nuts, chopped or finely divided, with or without additional food ingredients, are added to the concentrated syrup with vigorous mechanical agitation or impact beating within a crystallization zone. A cocrystallized sugar-nut product is produced, comprising aggregates of sugar crystals in intimate association with the nuts and any food ingredient. The cocrystallized sugar-nut product is dry, stable, free-flowing and possesses functional food ingredient characteristics, such as fondant quality and extrusion and compaction capabilities. The cocrystallized sugar-nut product, additionally, is capable of being dispersed in water.

37 Claims, 2 Drawing Figures

COCRYSTALLIZED SUGAR-NUT PRODUCT

BACKGROUND OF THE INVENTION

This invention relates to a free-flowing, stable, dry nut product which has functional food ingredient characteristics. More specifically, this invention relates to a crystalline sugar product which incorporates nuts and to a process for making the crystalline sugar product incorporating nuts.

Nuts have pleasant aromas and flavors, crunch texture, and high energy and protein food value. Accordingly, nuts are popular as foodstuffs. Food producers and processors have long utilized nuts in food products. Such products range from confections, bakery products, snack items, breakfast cereals to protein foods.

Nuts, such as peanuts, walnuts and pecans, have a very high oil content, ranging from 40% to 60% by weight. Ground or pulverized nuts have high susceptibility to oxidation or rancidity during storage. However, on separation of the oil from the ground nut product, the nut flavor is associated more with the oil rather than with the meal. Consequently, defatted nut flour meal is unacceptable in most formulations. Due to the oily, creamy or buttery texture of ground or pulverized nuts, such nut product also has poor flow characteristics, which will adversely affect the flow characteristics of any dry mix into which it is incorporated, creating problems with handling and packaging, in addition to the storage problem. Additionally, ground or pulverized nuts are not readily dispersible in liquids, such as water.

Various types of dehydration processes, such as drum drying and spray drying, have been evaluated for use on nuts. Experimental studies show the technical feasibility of preparing dry nut powders using whey or non-fat milk solids, dextrin or starches as carriers. In preparing the powder, the primary intent is to reverse the normal phases of the nut. In its natural state, oil constitutes the continuous phase in the nut, and the non-oil components the discontinuous phase. In drying, nut oil is coated by non-oil components and thus becomes a discontinuous phase. The resulting powder is free-flowing and may be dispersed in dry mixes readily. The resulting nut powder, however, lacks fondant or icing quality or other functional ingredient characteristics. Accordingly, the acceptance in the food industry of such products has been limited to flavorings.

In the manufacture of sugar and sugar products, a process known as transformation is used to convert a sugar syrup into a dry, sugar product. The resulting product is granular, free-flowing, non-caking and is readily dispersed or dissolved in water. The transformation process has been described in: U.S. Pat. No. 3,149,682, Tippens et al.; U.S. Pat. No. 3,365,331, Miller et al.; U.S. Pat. No. 4,159,210, Chen et al.; and in co-pending, co-assigned applications entitled "Crystallized, Readily Water-Dispersible Sugar Product," Ser. No. 199,551 filed Oct. 22, 1980 (Chen et al.), now U.S. Pat. No. 4,338,350, and "Crystallized, Readily Water-Dispersible Sugar Product Containing Heat Sensitive, Acid or High-Invert Sugar Substances," Ser. No. 199,553 filed Oct. 22, 1980 (Chen et al.), now U.S. Pat. No. 4,362,757.

In Tippens et al., the method comprises concentrating sugar syrup to a solids content of about 95-97% by heating the sugar syrup to a temperature of about 250°-265° F., and subjecting the resulting supersaturated sugar syrup to a heat dissipation operation simultaneously with vigorous agitation or impact beating. Such method produces a dry sugar product comprising aggregates of fondant-size (about 3-50 microns) sucrose crystals. Miller et al. describes a similar process in which impact beating is used to crystallize the sugar product from the supersaturated sugar syrup. Both Tippens et al. and Miller et al. disclose the sugar products prepared in accordance with their invention are useful as carriers for additive materials, which may have a food, taste, color or medicinal value, or the like. The food additive may be incorporated at any step in the process, such as during concentration, or by separate blending and mixing operation with the sugar product, depending on the nature of the additive material.

In the Chen et al. applications, the transformation method described is adapted so that a food ingredient is crystallized with the sucrose crystals from a mixture of the sugar syrup and the food ingredient. Accordingly, the processes described in the Chen et al. applications are referred to as "cocrystallization." The resulting products are granular, homogeneous, dry, free-flowing and non-caking. Further, as described in the Chen et al. applications, because the structure of the products is loose, lacy clusters of micro-size sucrose crystals intimately associated with the food ingredient, the products are readily dispersible in water and liquids.

Accordingly, it is an object of this invention to provide a product which incorporates nuts, which nut-incorporated product is stable and a functional food ingredient.

It is also an object of this invention to provide a nut-incorporated product in dry, granular, free-flowing and non-caking form.

It is also an object of this invention to provide a nut-incorporated product which is readily dispersed in liquid.

It is also an object of this invention to provide a method for preparing a dry, granular, free-flowing and stable product incorporating nuts.

It is a further object of this invention to provide a method for preparing a dry, granular product incorporating nuts which has functional food ingredient characteristics.

These and other objects are accomplished by means of the present invention described below.

SUMMARY OF THE INVENTION

A sugar-nut product, which is stable, free-flowing, dry and readily dispersible in water, is disclosed and a method for its preparation is provided. A sugar syrup is concentrated to over about 90% solids content. Concentration is accomplished through evaporation by heating the sugar syrup to about 250°-300° F. at atmospheric pressure or under vacuum. A predetermined weight of nuts, with or without other food ingredients, is added to the hot sugar syrup, and, with vigorous mechanical agitation, the contents are thoroughly mixed. Agitation or impact beating within a crystallization zone is continued until a cocrystallized sugar-nut product is formed. The sugar-nut product of the present invention comprises aggregates of fondant-sized sugar crystals in intimate association with the nuts. The sugar-nut product of the present invention is readily dispersible in water.

Employing the teachings of the present invention, nuts such as peanuts, almonds, beechnuts, Brazil nuts, coconuts, cashew nuts, chestnuts, hazelnuts, hickory nuts, macadamia nuts, and nut products such as peanut butter and cashew butter, can be incorporated into a sugar matrix. The resulting sugar-nut product can operate as a functional food ingredient, e.g., in icings, and has compaction or extrusion characteristics.

DETAILED DESCRIPTION OF THE INVENTION

For purposes of the description of the invention herein set forth, the term sugar refers to carbohydrates which have a sweet taste and the general formulae:

or

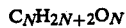

or

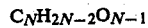

The term nut or nuts is meant to include all roasted, unroasted, whole, chopped, ground or pulverized nuts and nut butters, including peanuts, almonds, beechnuts, Brazil nuts, coconuts, cashew nuts, chestnuts, hazelnuts, hickory nuts, macadamia nuts, pecans, pine nuts, pistachio nuts, walnuts, other tree nuts, peanut butter, and cashew butter.

Figure 1:
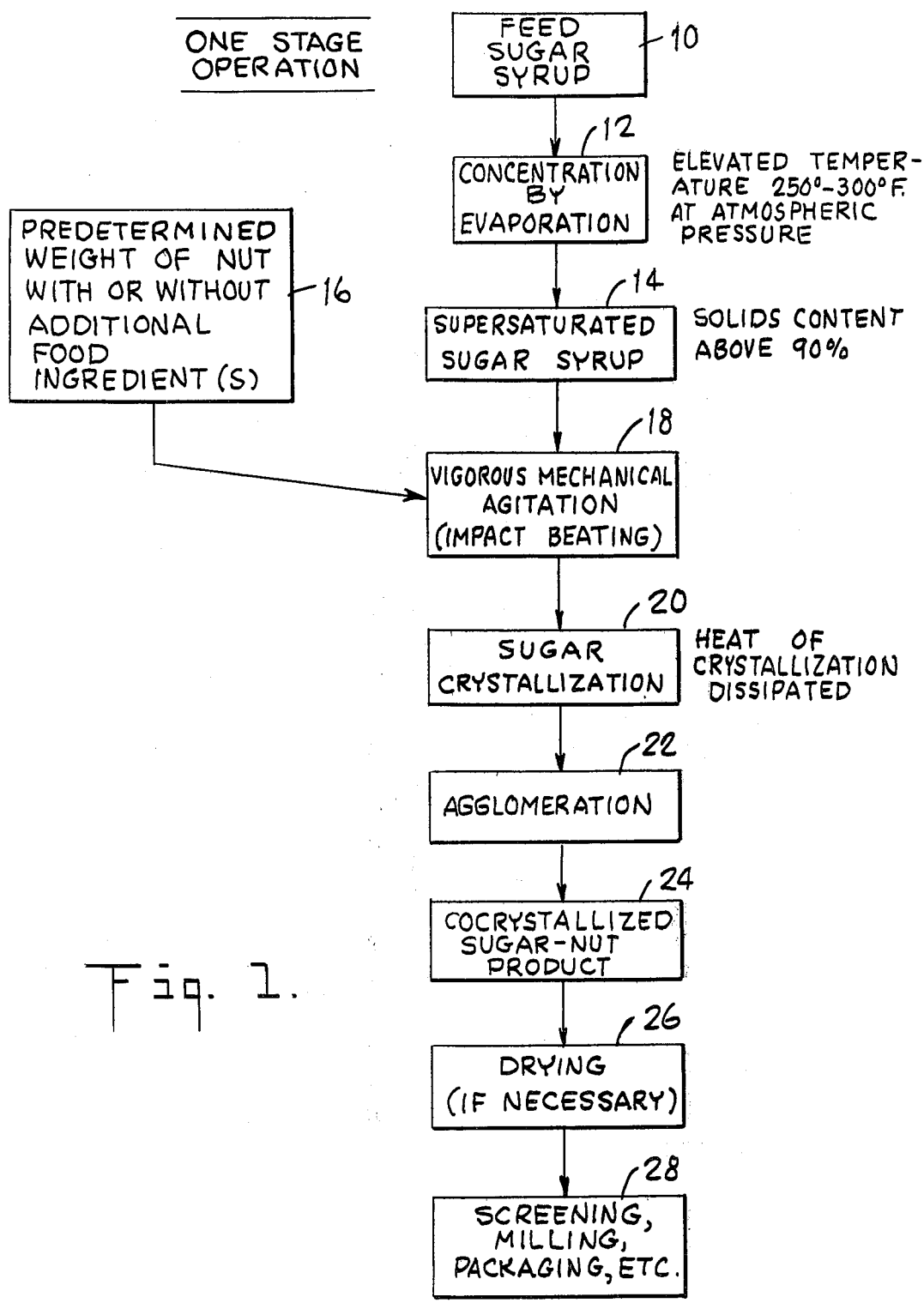
FIG. 1 is a flow chart illustrating one process or scheme for preparing a cocrystallized sugar-nut product in accordance with the present invention.

Referring to FIG. 1, a feed sugar syrup 10 is concentrated by evaporation 12 to a supersaturated sugar syrup 14 having a solids content in excess of about 90%. Concentration of the feed syrup is performed at an elevated temperature, in the range of about 250°-300° F. at atmospheric pressure, and may also be performed under vacuum. The feed syrup may be concentrated in a vacuum pan evaporator, in a rising and falling concentrator, or in a heat exchange evaporator under suitable conditions. The concentrators can be either continuous or batch-type, as desired.

The feed syrup can contain sucrose, dextrose, monosaccharides, disaccharides, dextrins, sugar alcohols or any combination thereof.

The resulting supersaturated sugar syrup having a solids content in excess of about 90% is maintained at a temperature not less than about 240° F. at atmospheric pressure in order to prevent premature crystallization. A predetermined weight of nuts, with or without additional food ingredient 16, such as chopped, ground or pulverized nuts or nut butter, is added to the concentrated syrup with vigorous mechanical agitation 18, such as by impact beating, within a crystallization zone. The additional food ingredient(s) should be heat stable. Additional food ingredient(s) include(s) cocoa powder, starch, gum, among others. Alternatively, the concentrated sugar syrup may be added to a predetermined amount of nuts with or without additional food ingredient, and mixed in a similar manner. The device used for mechanical agitation could be a beater-crystallizer, a Turbulizer, a nucleator-crystallizer, a high-speed or shear mixer, or a blender.

Impact beating or vigorous agitation is continued within the crystallization zone until the supersaturated syrup/nut with or without additional food ingredient(s) mixture is transformed, crystallized 20, and agglomerated 22. A cocrystallized sugar-nut product 24 is recovered from the crystallization zone. The latent heat of crystallization is generally sufficient to evaporate the moisture so that the product is substantially dry, i.e., has moisture content of less than about 1% by weight, followed by screening, milling and packaging 28. If the moisture content of the crystalline sugar-nut product is in excess of about 1% by weight, the cocrystallized sugar-nut product is dried 28 before screening, milling and packaging.

Suitable apparatus for carrying out the process of the present invention is a continuous operation is described in U.S. Pat. No. 3,365,331 (Miller et al.).

Figure 2:
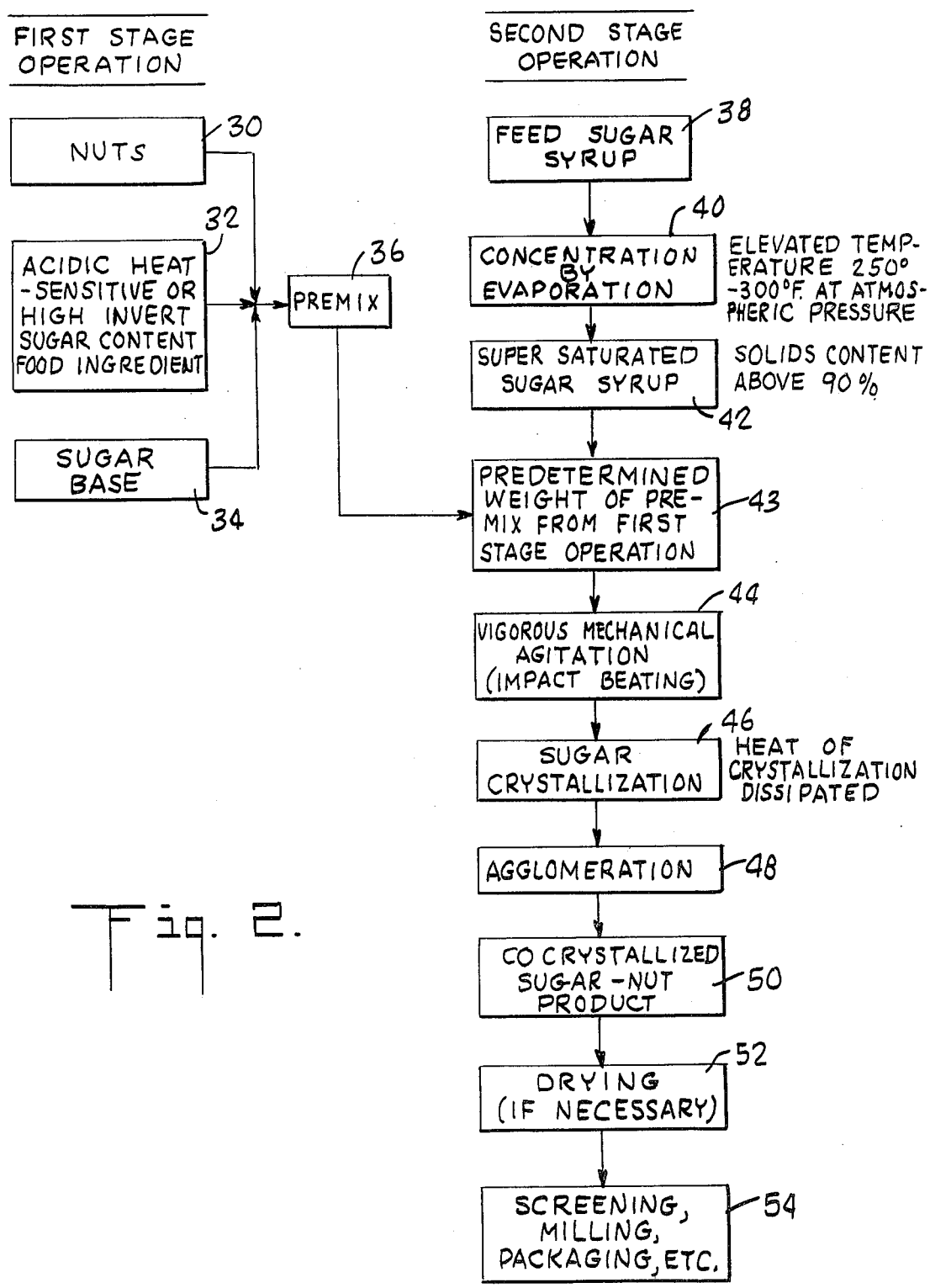
FIG. 2 is a flow chart illustrating one process or scheme for preparing a cocrystallized sugar-nut product containing additionally a heat-sensitive, acidic or high invert sugar food ingredient, in accordance with the present invention.

Referring to FIG. 2, a two-stage process for preparing a cocrystallized sugar-nut product additionally incorporating an acidic, heat sensitive or high invert sugar content food ingredient is shown. A predetermined weight of chopped, ground or pulverized nuts 30 is mixed with a food ingredient containing heat-sensitive or acidic substances or having a high invert sugar content 32 and a sugar base 34, such as granulated or powdered sugar, to form a premix 36. For example, the acidic, heat sensitive or heat invert sugar content food ingredient may be a volatile flavor, an enzyme, vitamin C (ascorbic acid), a fruit juice concentrate, honey, molasses or any combination thereof. The nuts and acidic, heat sensitive or high invert sugar content food ingredient are blended and mixed with the sugar base, for example, by means of a Hobart blender, until the desired degree of homogeneity of the premix is achieved.

In the second stage of the operation, feed sugar syrup 38 is concentrated by evaporation 40 to a supersaturated sugar syrup 42 having a solids content in excess of about 90%. Concentration of the feed syrup is performed at an elevated temperature, in the range of about 250°-300° F. at atmospheric pressure, and may also be performed under vacuum. The feed syrup may be concentrated in a vacuum pan evaporator, in a rising and falling concentrator, or in a heat exchange evaporator under suitable conditions. The concentrators can be either continuous or batch-type, as desired.

The feed syrup can contain sucrose, dextrose, monosaccharides, disaccharides, dextrins, sugar alcohols, or any combination thereof.

The resulting supersaturated sugar syrup 42 having a solids content in excess of about 90% is maintained at a temperature not less than about 240° F. at atmospheric pressure in order to prevent premature crystallization. A predetermined weight of the premix 36 is added 43 to the concentrated syrup with vigorous mechanical agitation 44, such as by impact beating, within a crystallization zone. Alternatively, the concentrated sugar syrup may be added to a predetermined amount of the premix and mixed in a similar manner. The device used for mechanical agitation could be a beater-crystallizer, a Turbulizer, a nucleator-crystallizer, a high-speed or shear mixer, or a blender.

Impact beating or vigorous agitation is continued within the crystallization zone until the supersaturated syrup/premix is transformed, crystallized 46, and agglomerated 48. A crystallized sugar-nut product 50 is recovered from the crystallization zone. The latent heat of crystallization is sufficient to evaporate the moisture so that the product is substantially dry, i.e., has a moisture content of less than about 1% by weight. If necessary, the cocrystallized sugar-nut product can be dried 52 to a moisture content of less than about 1% by weight followed by screening, milling and packaging 54.

If the methods of the present invention are performed in a continuous operation, a rising and falling concentrator, a vapor separator and a beater-crystallizer, e.g., a Turbulizer, may be employed. Suitable apparatus is also described in U.S. Pat. No. 3,365,331 (Miller et al.).

In both the single-stage process and two-stage process of the present invention, it is desirable during crystallization to remove the heat of crystallization to prevent overheating within the crystallization zone. The heat of crystallization can be removed or dissipated by indirect heat exchange, e.g., by surrounding the crystallization apparatus with a water jacket, or, preferably, by forced air flow through the beater-crystallizer, e.g., with a vapor separator.

In the preparation of the sugar syrup feed for the method of the present invention, either single-stage or two-stage, to minimize chemical change such as inversion, decrease in pH and sugar caramelization during concentration, a multiple-stage evaporation process can be employed. In such case, the evaporation time is shortened and evaporation temperature is lowered during the initial stages. This is accomplished through controlling the absolute pressure of concentration, e.g., operation at low absolute pressure during the initial stage or stages.

In the method of the present invention whereby a premix of nut is formed with a heat sensitive, acidic or high invert sugar content food ingredient, it is desirable to introduce the premix into the supersaturated, concentrated sugar syrup as early as possible in order to insure maximum hmogeneity in the final product. The premix is introduced during the sugar crystallization step. The premix is thoroughly blended in during the initial stage of the crystallization action of the supersaturated sugar syrup as the syrup is transformed from the liquid state to the semisolid form in which the crystals are in suspension. Consequently, when the material has reached the relatively dry, agglomerated state, the resulting mixture is composed of a homogeneous blend of sugar-nut microcrystalline agglomerates. The admixture of sugar base, such as granulated or powdered sugar, with the nut and food ingredient in the formation of the premix, is to protect the acidic, heat sensitive or high invert sugar content food ingredient from any potential thermal decomposition, and to promote or accelerate crystallization during the sugar transformation process.

The physical structure of the cocrystallized sugar-nut roduct is highly dependent on the rate and temperature of impact beating and crystallization, and on the degree of sugar transformation. The optimum time for the mixture of concentrated sugar syrup and nut, with or without any additional food ingredients(s), to spend in the crystallization zone during impact beating depends on several factors, including: (a) the nature of the non-sucrose solids (such as invert sugar and ash) in the feed syrup; (b) the nature and characteristics of the secondary food ingredient (such as moisture content, invert sugar content, pH, etc.); (c) the concentration of nut and any additional food ingredient in the supersaturated sugar syrup mixture; and (d) the temperature used for concentration of the feed sugar syrup. The most satisfactory product results are obtained when the solids content of the feed syrup is not less than about 80% sucrose and when the weight percent of nut with or without additional food ingredient in the single-stage process or premix in the two-stage process is not more than about 50% by weight of the concentrated sugar syrup.

In structure, the cocrystallized sugar-nut product of the present invention is comprised of aggregates or agglomerates of fondant-size sugar crystal, e.g., in the range of about 3–50 microns, intimately associated with the non-sugar solids. The agglomerates form a loose-lacy network bonded together at their interfaces by point contact. Accordingly, aqueous liquid can rapidly penetrate the porous clusters of agglomerates and free each of the particles making up the agglomerates. The particles thus become readily dispersed and/or dissolved in the aqueous liquid.

In the cocrystallized sugar-nut product of the present invention, the nut is incorporated as an integral part of the sugar matrix and there is no tendency for the nut to separate or settle out during handling, packaging, or storage. The resulting product is granular, free-flowing and non-caking.

The structure and properties of the cocrystallized sugar-nut product of the present invention and prepared in accordance with this invention are distinctly different from conventional, spray-dried or drum-dried nut-incorporated products, as noted herein, which have a tendency to cake or lump in storage. The characteristics of the cocrystallized sugar-nut product are different from sugar products prepared by the candy melt process of U.S. Pat. No. 3,341,334, which products are composed of large, coarse, perfect crystals, due to the slow rate and low temperature crystallization. The cocrystallized sugar-nut product prepared according to the present invention is composed, in contrast, of micro-size, porous, imperfect, agglomerated crystals due to a combination of rapid rate and high temperature crystallization, characteristic with impact beating.

Generally, the cocrystallized sugar-nut product of the present invention possesses two functional characteristics as a food ingredient. The sugar-nut product has fondant and icing quality characteristics. Further, the cocrystallized sugar-nut product of the present invention has direct compaction or tableting or extrusion property characteristics. Furthermore, the cocrystallized sugar-nut product of the present invention, because of its ready dispersibility in liquids such as water, can be used in more food applications than prior nut-incorporated products.

The cocrystallized sugar-nut product of the present invention is stable. As noted hereinabove, the stability of a nut or nut product is dependent upon the degree of oxidation or rancidity during storage.

An oxidation test, peroxide value determination, was conducted on one cocrystallized sugar-nut product prepared in accordance with the above invention. A cocrystallized sugar-nut product was prepared, containing about 40% peanut butter and about 60% sucrose. A dry-blended peanut-butter incorporated product, containing about 40% peanut butter and about 60% sucrose was also prepared. Both products were stored at 100° F. for eight weeks. The peroxide values of each product were determined by the A.O.A.C. method and expressed as milliequivalent peroxide/kg peanut oil. The lower the reading, the lower the degree of oxidation or rancidity present in the tested product. The experimental data of the peroxide values of the cocrystallized sugar-peanut butter product versus the corresponding dry-blended product are presented below in Table 1. The results indicate that the peroxide values of the dry-blended product were much higher than the cocrystallized sugar-peanut butter product. For example, after two, six and eight weeks of storage, the cocrystallized sugar-peanut butter product had peroxide values of 1.38, 2.85 and 3.33 respectively. The corresponding peroxide values of the dry-blended peanut butter product were 10.22, 23.20 and 29.01 respectively. Such large differential can be explained in that by use of the cocrystallized process of the present invention, the peanut butter becomes an integral part of the product. homogeneously mixed throughout. The peanut butter, accordingly, is not subject to exposure and thus is relatively unavailable for oxidation. In contrast, the components of the dry-blended peanut butter product have a tendency to "settle out," so the peanut butter is readily exposable for oxidation. Generally, the cocrystallized sugar-nut product of the present invention has a very long shelf life, even when stored for an appreciable period of time.

TABLE I

PEROXIDE VALUES OF NUT PRODUCTS DURING STORAGE AT 100° F.

| STORAGE TIME (WEEK(S)) | PEROXIDE VALUE (MEQ PEROXIDE/KG) | |
|---|---|---|
| | COCRYSTALLIZED PRODUCT | DRY-BLENDED PRODUCT |
| 0 | 1.21 | 1.21 |
| 2 | 1.38 | 10.22 |
| 6 | 2.85 | 23.20 |
| 8 | 3.33 | 29.01 |

A wide variety of products may be prepared in accordance with the present invention. The following examples illustrate various embodiments of this invention, but are not meant in any way to limit the scope thereof.

EXAMPLE 1

A sugar solution of 65° Brix was heated to 265° F. at atmospheric pressure to form a supersaturated syrup of approximately 96.5% solids content by weight. An amount of peanut butter equal to 40% by weight of the saturated solution sugar was then added with controlled agitation (impact beating). Impact beating was continued until the mixture was converted into a substantially dry product. As the crystallization of the sugar proceeded, the peanut butter was incorporated into the sugar matrix of fondant-size sugar crystals. The heat of crystallization, which accompanied the exothermic reaction, aided in removing moisture, resulting in a free-flowing product.

EXAMPLE 2

The sugar solution used, and the ratio of sugar solution to peanut butter, were the same as that described in Example 1. However, instead of adding the peanut butter to the supersaturated solution, the supersaturated solution was added to the peanut butter with impact beating. Impact beating was continued and crystallization proceeded, resulting in the formation of a stable, free-flowing sugar-nut product.

EXAMPLE 3

A sugar solution of 65° Brix was heated to 265° F. at atmospheric pressure to form a supersaturated sugar syrup of approximately 96.1% solids content by weight. An amount of chopped peanuts equal to about 20% by weight of the supersaturated syrup was then added with controlled agitation. A slurry of chopped peanut solids in sugar syrup was initially formed. Agitation was continued until the mixture was converted into a dry, free-flowing product.

EXAMPLE 4

A brown sugar syrup (65° Brix) was heated to 270° F. at atmospheric pressure to form a supersaturated syrup of approximately 97.0% solids content by weight. An amount of peanut butter equal to 30% by weight of the sugar solution was added to the hot, concentrated syrup with vigorous mechanical agitation. Agitation was continued until the mixture was transformed and agglomerated into a dry, free-flowing sugar-nut product.

EXAMPLE 5

Four-hundred grams of peanut butter were blended with 250 grams of honey (80° Brix) and 100 grams of powdered sugar, to form a premix. A supersaturated sugar solution of approximately 98.1% solids content by weight was prepared by heating 65° Brix sugar solution to 285° F. at atmospheric pressure. Seven-hundred grams of the premix were added with vigorous mechanical agitation to 1,300 grams of the supersaturated hot syrup. Impact beating was continued until the mixture was converted into a dry, free-flowing sugar-nut product.

EXAMPLE 6

Three-hundred grams of chopped walnut were blended with 100 grams of powdered maple sugar and 10 grams of natural maple flavor extracts. Nine-hundred grams of maple syrup (65° Brix) were heated to 270° F. at atmospheric pressure to form a supersaturated sugar solution of approximately 98.0% solids content by weight. The supersaturated sugar solution was added to the premix with impact beating. Impact beating was continued, and crystallization proceeded, resulting in the formation of a dry maple sugar-walnut product.

EXAMPLE 7

Three-hundred grams of peanut butter were mixed with 154 grams of grape juice (65° Brix) and 50 grams of powdered sugar to form a premix. Seven-hundred grams of sugar solution, 65° Brix, were heated to 285° F. at atmospheric pressure to form a supersaturated sugar syrup of approximately 98.0% solids content by weight. The supersaturated sugar syrup was added to the premix with impact beating. Impact beating ws continued until the mixture was transformed, and agglomerated into a free-flowing sugar-nut product.

EXAMPLE 8

Two-hundred grams of peanut butter were blended in dry state with 50 grams of cocoa butter and 50 grams of powdered sugar to form a premix. A supersaturated sugar syrup of approximately 97.0% solids content by weight was prepared by heating 65° Brix sugar solution to 270° F. at atmospheric pressure. Three-hundred grams of the premix were added to 700 grams of the hot, saturated sugar solution with impact beating. Impact beating was continued and crystallization proceeded, resulting in the formation of a free-flowing, dry, cocoa-flavored sugar-nut product.

All of the above sugar- and nut-incorporated examples of the present invention are dry, granular, free-flowing and non-caking. They are readily dispersible in water. In addition, they are homogeneous, and do not separate into compartments or "settle out" with storage and handling.

Profiles of cocrystallized sugar-nut products prepared in accordance with this invention are presented in Tables II and III.

present invention can also be used in confections. For example, cocrystallized sugar-nut products can be compacted or extruded to form or act as a component of candy tablets and cast nut creams.

Cocrystallized sugar-nut products can also be used as ingredients in cake mixes and formulations for cookies, doughnuts, breads, puddings, fudges, pies and drinks. Additionally, cocrystallized sugar-nut products can be used in icings and toppings for ice cream, cereal, and

TABLE II

TYPICAL ANALYSIS OF THE COCRYSTALLIZED NUT PRODUCTS PREPARED BY SINGLE-STAGE PROCESS

|  | PEANUT BUTTER PRODUCT (Example 1) | WALNUT PRODUCT | PEANUT BUTTER/BROWN SUGAR PRODUCT (Example 4) |
|---|---|---|---|
| OPERATION DATA | | | |
| Feed Syrup | 65° Brix Sucrose Solution | 65° Brix Sucrose Solution | Brown Sugar Syrup (65° Brix) |
| Nut Type | Peanut Butter | Chopped Walnuts | Peanut Butter |
| Temperature of Saturated Syrup | 265° F. | 260° F. | 270° F. |
| Solids Content of Supersaturated Syrup | 96.5% | 96.1% | 97.0% |
| FINISHED PRODUCT ANALYSIS | | | |
| Sucrose Content | 58.5% | 79.1% | 67.1% |
| Invert Sugar Content | 0.1% | 0.2% | 1.8% |
| Oil Content | 21.7% | 11.2% | 16.8% |
| Moisture Content (after agglomeration; no drying) | 0.7% | 0.7% | 0.8% |
| Nut Content | 40.0% | 20.0% | 30.0% |
| Screen Analysis (Tyler) | | | |
| No. 8 | 4.5% | 34.2% | 14.2% |
| No. 14 | 11.2% | 54.1% | 21.6% |
| No. 20 | 16.2% | 10.7% | 31.2% |
| No. 28 | 15.55 | 1.0% | 26.5% |
| No. 35 | 31.0% | 0 | 6.0% |
| No. 60 | 21.6% | 0 | 0.5% |

TABLE III

TYPICAL ANALYSIS OF THE COCRYSTALLIZED NUT PRODUCTS PREPARED BY TWO-STAGE PROCESS

|  | HONEY-NUT | MAPLE-NUT | GRAPE-NUT | CHOCOLATE-NUT |
|---|---|---|---|---|
| OPERATION DATA | | | | |
| FIRST-STAGE | | | | |
| Premix Composition (ratio by weight) | Peanut Butter/ Honey/ Sugar (8/5/2) | Chopped Walnut Maple Sugar/ Flavor (3/1/0.1) | Grape Juice/ Peanut Butter/ Sugar (3/6/1) | Cocoa Butter/ Peanut Butter/ Powdered Sugar (1/4/1) |
| SECOND-STAGE | | | | |
| Feed Syrup | Premix/Sugar 65° Brix Sucrose Solution | Premix/Sugar Maple Syrup 65° Brix | Premix/Sugar 65° Brix Sucrose Solution | Premix/Sugar Brown Sugar Syrup 65° Brix |
| Elevated Temperature | 285° F. | 270° F. | 285° F. | 270° F. |
| Solids Content of Supersaturated Syrup | 98.1% | 97.0% | 98.0% | 97.0% |
| Composition (% wt.)* | 35% | 40% | 35% | 30% |
| FINISHED PRODUCT ANALYSIS | | | | |
| Sucrose Content | 69.1% | 65.1% | 66.3% | 67.2% |
| Invert Sugar Content | 10.2% | 3.1% | 8.2% | 2.3% |
| Moisture Content (after agglomeration; no drying) | 1.6% | 0.6% | 1.3% | 1.7% |
| Oil Content | 10.8% | 13.8% | 11.4% | 11.1% |
| Screen Analysis (Tyler) | | | | |
| No. 8 | 2.1% | 41.2% | 12.1% | 12.6% |
| No. 14 | 14.2% | 26.3% | 24.5% | 21.2% |
| No. 20 | 26.5% | 24.1% | 31.6% | 28.6% |
| No. 28 | 28.4% | 8.2% | 16.5% | 21.7% |
| No. 35 | 15.4% | 0.2% | 11.0% | 10.2% |
| No. 60 | 13.4% | 0 | 4.3% | 5.7% |

*Approx. % by weight of premix in mixture of premix and supersaturated syrup.

Cocrystallized sugar-nut products according to the present invention can be used as a crisp, crunch or chip type of snack food. Products made according to the other foods where toppings are appropriate.

The nut component of the cocrystallized sugar-nut product prepared in accordance with this invention can also comprise one or more nuts, e.g., peanuts and coconuts.

While the invention has been described with reference to specific embodiments, there were for purposes of illustration only and should not be construed to limit the scope of the present invention.

What is claimed is:

1. A method for preparing a cocrystallized sugar-nut product comprising:
   (a) concentrating a sugar syrup at atmospheric pressure or under vacuum at a temperature in the range of about 250° F. to about 300° F. to a solids content in excess of about 90% by weight;
   (b) directly admixing the concentrated sugar syrup at a temperature not less than about 240° F. to about 300° F. at atmospheric pressure with nuts or finely divided nuts to form a mixture;
   (c) subjecting the resulting mixture to impact beating within a crystallization zone until a cocrystallized sugar-nut product is formed comprising nuts and crystalline sugar, the crystalline sugar of said product being made up of aggregates of fondant-size sugar crystals, and the product having a moisture content of less than about 2.5% by weight; and
   (d) recovering the cocrystallized sugar-nut product from the crystallization zone.

2. The method of claim 1 further comprising drying the cocrystallized sugar-nut product to a moisture content of less than about 1% by weight.

3. The method of claim 1 wherein the solids content of the concentrated sugar syrup comprises not less than about 80% by weight sucrose.

4. A cocrystallized sugar-nut product made in accordance with the method of claim 1.

5. The cocrystallized sugar-nut product of claim 4 wherein the finely divided nuts are peanuts.

6. The cocrystallized sugar-nut product of claim 4 wherein said finely divided nuts are peanut butter.

7. The cocrystallized sugar-nut product of claim 4 wherein the finely divided nuts are walnuts.

8. The cocrystallized sugar-nut product of claim 4 wherein the finely divided nuts are cashew nuts.

9. The cocrystallized sugar-nut product of claim 4 wherein the finely divided nuts include coconuts.

10. A method for preparing a cocrystallized sugar-nut product containing nuts and a food ingredient comprising:
    (a) concentrating a sugar syrup at atmospheric pressure or under vacuum at a temperature in the range of about 250° F. to about 300° F. to a solids content in excess of about 90% by weight;
    (b) directly admixing the concentrated sugar syrup at a temperature not less than about 240° F. to about 300° F. at atmospheric pressure with nuts or finely divided nuts and a food ingredient to form a mixture;
    (c) subjecting the resulting mixture to impact beating within a crystallization zone until a cocrystallized sugar-nut product is formed comprising nuts, said food ingredient and crystalline sugar, the crystalline sugar of said product being made up of aggregates of fondant-size sugar crystals, and the product having a moisture content of less than about 2.5% by weight; and
    (d) recovering the cocrystallized sugar-nut product from the crystallization zone.

11. The method of claim 10 further comprising drying the cocrystallized sugar-nut product to a moisture content of less than about 1% by weight.

12. The method of claim 10 wherein the solids content of the concentrated sugar syrup comprises not less than about 80% by weight sucrose.

13. A cocrystallized sugar-nut product made in accordance with the method of claim 10.

14. A cocrystallized sugar-nut product of claim 13 wherein the finely divided nuts are peanuts.

15. Th cocrystallized sugar-nut product of claim 13 wherein the finely divided nuts are peanut butter.

16. The cocrystallized sugar-nut product of claim 13 wherein the finely divided nuts are walnuts.

17. The cocrystallized sugar-nut product of claim 13 wherein the finely divided nuts are cashew nuts.

18. The cocrystallized sugar-nut product of claim 13 wherein the finely divided nuts include coconut.

19. The cocrystallized sugar-nut product of claim 13 wherein the food ingredient comprises an emulsifier.

20. The cocrystallized sugar-nut product of claim 13 wherein the food ingredient comprises a stabilizer.

21. The cocrystallized sugar-nut product of claim 13 wherein the food ingredient comprises cocoa or carob.

22. The cocrystallized sugar-nut product of claim 13 wherein the food ingredient comprises a modified starch.

23. A method for preparing a cocrystallized sugar-nut product containing nuts or finely divided nuts and a food ingredient selected from the group consisting of heat-sensitive, acidic and high invert sugar substances comprising:
    (a) admixing the nuts and the food ingredient with a dry sugar base to form a premix;
    (b) concentrating a sugar syrup at atmospheric pressure or under vacuum at a temperature in the range of about 250° F. to about 300° F. to a solids content in excess of about 90% by weight;
    (c) directly admixing the concentrated sugar syrup at a temperature not less than about 240° F. to 300° F. at atmospheric pressure with the premix to form a mixture;
    (d) subjecting the resulting mixture to impact beating within a crystallization zone until a cocrystallized sugar-nut product comprising nuts, said food ingredient and crystalline sugar, the crystalline sugar of said product being made up of aggregates of fondant-size sugar crystals, and the product having a moisture content of less than about 2.5% by weight; and
    (e) recovering the cocrystallized sugar-nut product from the crystallization zone.

24. The method of claim 23 further comprising drying the cocrystallized sugar-nut product to a moisture content of less than about 1% by weight.

25. The method of claim 23 wherein the solids content of the concentrated sugar syrup comprises not less than about 80% by weight sucrose.

26. A cocrystallized sugar-nut product made in accordance with the method of claim 23.

27. The cocrystallized sugar-nut product of claim 26 wherein the finely divided nuts are peanuts.

28. The cocrystallized sugar-nut product of claim 26 wherein the finely divided nuts are peanut butter.

29. The cocrystallized sugar-nut product of claim 26 wherein the finely divided nuts are walnuts.

30. The cocrystallized sugar-nut product of claim 26 wherein the finely divided nuts include coconuts.

31. The cocrystallized sugar-nut product of claim 26 wherein the food ingredient comprises a volatile flavor, a nonvolatile flavor or an essential oil.

32. The cocrystallized sugar-nut product of claim 26 wherein the food ingredient comprises honey or molasses.

33. The cocrystallized sugar-nut product of claim 26 wherein the food ingredient comprises a fruit juice.

34. The cocrystallized sugar-nut product of claim 33 wherein the fruit juice comprises orange juice, apple juice or grape juice.

35. The cocrystallized sugar-nut product of claim 26 wherein the food ingredient comprises a vitamin.

36. The cocrystallized sugar-nut product of claim 26 wherein the food ingredient comprises an enzyme or an active culture.

37. The cocrystallized sugar-nut product of claim 26 wherein the food ingredient comprises an acidulent substance.

* * * * *